United States Patent Office 2,968,581
Patented Jan. 17, 1961

2,968,581

METHOD OF INSOLUBILIZING POLYMERIC HYDROXYL-BEARING COMPOUNDS

Bernard H. Kress, Lafayette Hill, Pa., assignor to Quaker Chemical Products Corporation, Conshohocken, Pa., a corporation of Pennsylvania No Drawing. Filed Jan. 15, 1957, Ser. No. 634,169

15 Claims. (Cl. 117—139.5)

This invention relates to a method of insolubilizing water-soluble or water-dispersible polymeric materials bearing hydroxyl groups and derivatives thereof. In particular, it relates to a method of insolubilizing starches, starch derivatives, and vinyl ester polymers and copolymers, such as vinyl formate, acetate, propionate, and stearate. More specifically, it relates to a process for imparting durability to textile and paper finishes and coatings containing such polymeric materials by applying a stiffening agent thereto. Still more specifically, it relates to a process of textile finishing whereby the stiffening agent will be durably fixed in the goods with respect to repeated launderings and dry cleanings.

This application is a continuation-in-part of copending application Serial No. 508,318, now Patent No. 2,785,995, filed May 13, 1955.

In place of starches, starch derivatives, and vinyl ester polymers, other high molecular weight hydroxyl-bearing compounds, their esters and ethers, such, for example, as polyvinyl alcohol, water-soluble cellulose derivatives, natural gums, dextran, polyvinyl methyl ether and the like, may also be used in the process of this invention as hereinafter set forth.

It is my belief that the polymeric acetals used as insolubilizing agents according to my invention cause some sort of cross-linking between molecules of starch, starch derivatives, polyvinyl acetate or the like. When the process of this invention is applied to the insolubilization of resins, starches, and the like on reactive substrates, such as cellulosic paper or textile fibers or regenerated cellulosic films, reaction may occur between the resin or starch and the substrate, thus doubly ensuring insolubilization of the finishing material of high polymeric nature and enhancing its resistance to laundering. The effect, however, is not proportional to the hydroxyl content of these polymeric materials because a greater degree of durability with respect to laundering is obtained, for example, when textiles finished with polyvinyl acetate are treated in accordance with this invention than when polyvinyl alcohol-finished textiles are so treated. The manner of cross-linking is therefore obscure and my invention is not restricted by any hypothetical mechanism of the chemical cause of the durability which I impart by this process.

Solutions of starches and such starch derivatives as hydroxyethyl starch, carboxymethyl starch, oxidized starch, sulfonated starch and the like, and polymers and copolymers of vinyl esters, such as vinyl formate, acetate, propionate, 2-ethyl hexoate, stearate and the like, in the form of aqueous emulsions are commonly applied to fabric to impart stiffness, fullness of hand or other properties with which the cloth is not normally endowed. Usually these agents, being water-soluble, are washed out of the fabric in laundering operations. Thus, the effect which they give in fabric finishing is not permanent.

The starch products which I may use according to this invention include corn, tapioca, wheat, potato, arrowroot, rice, waxy maize and sago. The modified starches include bleached and oxidized corn starch, hydrolyzed starches, and chemically modified starches. The oxidized starches include those oxidized by peroxides, such as hydrogen peroxide, sodium perborate, ammonium persulfate, alkaline peroxides, alkaline permanganates, and the like; by halogens, hypohalites and perhalates of chlorine, bromine and iodine.

The hydrolyzed starches and dextrines include those prepared by heating of starch, by acid hydrolysis, by alkaline hydrolysis and by enzymatic hydrolysis. The chemically modified starches include acylated starches, such as acetate esters of starch, the ethers of starch produced by alkylation with alkyl halides, or alkyl sulfates, alkylene oxides or halogen acids or esters.

I may also use dextran, hydrolyzed and fractionated dextrans and chemically modified dextrans. In addition, I may use water-soluble or dispersible cellulose derivatives, such as cellulose ethers, including methyl cellulose, hydroxyethyl cellulose, carboxymethyl cellulose, and the like.

Galactomannans, such as guar gum, gum arabic, galactans, such as karaya, polyuronic acids or salts thereof, such as algin and gum arabic, and gum tragacanth, acid galactan esters, such as agar and products derived therefrom, are also of use in this invention.

The starches and dextrines which I treat are described in Radley's "Starch and Its Derivatives," London, 1953, and Kerr's "Chemistry and Industry of Starch," New York, 1944. The cellulose ethers are described in Ott's "Cellulose and Cellulose Derivatives," New York, 1943. The gums and plant products are described in Mantell's "The Water-Soluble Gums," New York, 1947, and in "Natural Plant Hydrocolloids," Washington, D.C., 1954.

I may use water-soluble polyvinyl ethers, such as polyvinyl methyl ether, ether-maleic anhydride copolymers and their half amides.

Melamine-formaldehyde and urea-formaldehyde resins are presently used in order to "set" starch, starch derivatives and polyvinyl acetate resins. Use of these nitrogenous resins, however, suffers from several disadvantages as follows:

(1) *Formaldehyde odor.*—The odor of formaldehyde is present during processing and in the finished fabric. This odor becomes especially pronounced in steaming or pressing operations if the treated fabric is not sufficiently afterwashed.

(2) *Amine odor.*—Even with afterwashing, decomposition of resin in fabric treated as above gives rise to amine odors which are obnoxious.

(3) *Chlorine retention.*—Fabrics so treated will retain chlorine upon bleaching with chlorine-containing solutions. This will cause yellowing, and upon subsequent heating hydrochloric acid is liberated, causing deterioration of tensile strength.

I have found that polyacetals will insolubilize starch and starch derivatives and polyvinyl resins to render them relatively resistant to laundering.

Dahle in U.S. Patent 2,360,477 has disclosed the use of monomeric acetals in the insolubilization of polymeric hydroxyl-bearing compositions. In all cases he requires the use of free aldehyde in order to achieve his desired ends. Such use involves disadvantages which this invention does not. Use of free aldehydes and more particularly formaldehyde (or its polymers) in his invention gives rise to noxious fumes which are irritating to the mucosa and a definite health hazard. The present invention utilizes essentially aldehyde-free compositions which do not generate noxious fumes during reaction. This same criticism of noxious aldehyde fumes may be applied to the processes described in U.S. Patents 2,396,937 and 2,417,611.

Another disadvantage in the application of Dahle's process is the use of such volatile acetals as methylal and dioxolane. Since a large portion of the acetal may be lost by volatilization a larger quantity of such acetal is required. Use of higher molecular weight monomeric acetals introduces inefficiency in that the molecular equivalent of aldehyde available decreases as such molecular weight increases, thus limiting the amount of reactant molecule available.

Use of my polymeric acetal presents none of the above difficulties. The higher molecular weight of product imparts lack of volatility even at high cure temperatures, so that virtually none is lost. The amount of active aldehyde however is relatively large as there are repeating aldehyde units in the polyacetal.

An additional advantage of the polyacetal structure lies in its possibility of hydrogen bonding with the polymeric hydroxyl and acyloxy-bearing molecules. This makes for greater compatibility and solubility and hence reactivity between the polyacetals and the hydroxy polymers. Thus, aqueous solutions or dispersions of these polymers may readily be prepared for application permitting the most intimate interaction possible.

Dahle, on the other hand, stresses the topochemical, solid state nature of his reaction, and in fact, requires the multiple steps of his reaction to achieve his results.

U.S. Patent 2,504,857 describes the use of melamine formaldehyde resins with starches in order to obtain insolubilization. Urea and melamine formaldehyde resins, as well as dimethylol ethylene urea solutions all possess the dual disadvantage of noxious formaldehyde odor during processing and the development of odor after processing even if after washing of the treated textile is undertaken.

The polyacetals preferred in this invention may be prepared generally by reaction of an alkylene or a polyalkylene glycol with approximately a molar equivalent of an adehyde with simultaneous removal of water in order to obtain a polyacetal. These polymeric acetals contain at least two alkylidene radicals derived from at least one aldehyde having up to 10 carbon atoms and at least two alkylene radicals having 2 to 4 carbon atoms in a straight chain derived from the glycol.

Modified polyacetals such as those containing one or more groups derived from alcohols, carboxylic acids, amides, and the like, or combinations thereof may also be used. Such modified polyacetals are obtained by suitable interaction of the modifying compounds with the polyacetal chains to obtain greater surface activity or different solubility characteristics than are exhibited by the unmodified polyacetals. I may also use polyacetals obtained by direct catalytic reaction of ethylene oxide or propylene oxide with an aldehyde.

The following preparations serve to illustrate the polyacetals which may be used in carrying out my invention. The parts given are by weight.

PREPARATION A

| | Parts |
|---|---|
| Diethylene glycol | 106 |
| Paraformaldehyde (91%) | 33 |
| Sulfuric acid (99%) | 0.1 |
| Toluene | 20 |

The above components are mixed and heated under reflux in an apparatus equipped with a water trap. The solution is refluxed and water removed by azeotropic distillation. When 1 mole of water of reaction is removed the desired reaction is complete. The reaction mixture is neutralized with dilute sodium hydroxide solution or with triethanolamine and toluene is removed by evaporation in vacuo at temperatures not exceeding 110° C. The product is a viscous liquid, setting slowly to a crystalline mass. It is completely water-soluble and also soluble in toluene and esters. The product has a molecular weight of 480 (Rast) and a hydroxyl equivalent of 220 which indicate it has a linear polymeric structure. The supercooled liquid has a specific gravity of 1.155 at 94° F. and the refractive index is $N_D^{30}=1.462$. The molecular weight and hydroxyl equivalent of the condensation product of this example indicate that this product possesses a polymeric structure, containing an average of four diethylene glycol units, as shown in the following formula:

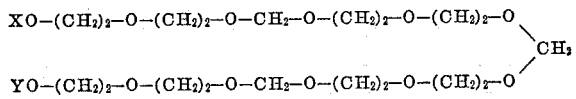

where X and Y may be either H or —CH₂OH. Higher and lower molecular weight products may also be obtained by modifying reaction conditions.

Dipropylene glycol, ditrimethylene glycol, dibutylene glycol, triethylene glycol, tripropylene glycol, tributylene glycol, tetraethylene glycol, tetrapropylene glycol, tetrabutylene glycol, pentaethylene glycol, pentapropylene glycol, pentabutylene glycol, and other polyalkylene glycols whose alkylene groups contain 2 to 4 carbon atoms in a straight chain may be also used in making the polyacetals. Polyalkylene glycols of molecular weights in the order of 200, 400, 500, 600, 800, and those of higher molecular weights such as 1000, 1200, 1500, 2000, 4000, 6000, 9000, and 22,000 and obtainable from the Carbide and Carbon Chemicals Company under the name "Carbowax" may similarly be used in place of diethylene glycol. Mixtures of the above may also be used. Instead of formaldehyde in any of its reactive forms such as trioxane, paraformaldehyde and methylal, I may use other aldehydes containing 2 to 10 carbon atoms. These include acetaldehyde or its polymers, propionaldehyde, butyraldehyde, pentanal, hexanal, heptanal, octanal, benzaldehyde, furfural, thienaldehyde, and dialdehydes such as glyoxal, malonaldehyde, succinaldehyde, glutaraldehyde, adipaldehyde, hydroxyadipaldehyde, pimelic aldehyde, suberic aldehyde, azelaic aldehyde and sebacic aldehyde, or the precursors, polymers or simple acetals of said aldehydes and dialdehydes. I may also use mixtures of said aldehydes.

Polyacetals such as those derived from the condensation of formaldehyde with ethylene oxide, propylene oxide, ethylene glycol, propylene glycol and trimethylene glycol, wherein alkylene groups alternate with alkylidene groups to form a polyacetal, are also useful. Certain compounds of this type are described by Gresham in U.S. Patents 2,395,265 and 2,350,350. Modifications of these polyacetals as described below are likewise applicable in starch and vinyl insolubilization.

In order to illustrate the use of mixtures of polyalkylene glycols in preparing polyacetals used in accordance with this invention, Preparation B is shown.

PREPARATION B

| | Parts |
|---|---|
| Diethylene glycol | 85 |
| Dipropylene glycol | 27 |
| Paraformaldehyde (91%) | 33 |
| Toluene | 20 |
| Sulfuric acid (99%) | 0.1 |

These reactants were treated as in Preparation A. The resulting product was a viscous liquid which formed a crystalline mass below 0° C. The product was soluble in water or toluene and had a faint ethereal odor.

It is apparent that, in this preparation, co-condensed polyacetals may be formed as well as mixtures of polyacetals and such combinations are useful in the process described herein.

Polyacetals as described above may be modified by aliphatic alcohols containing from 1 to 35 carbon atoms. Included among such alcohols are methyl, ethyl, propyl, isobutyl, amyl, 2-ethyl hexyl, decyl, lauryl, myristyl, cetyl, stearyl, ceryl, behenyl, myricyl, and gossypyl alcohols. Likewise, other branched chain alcohols, such as 7-ethyl-2-methyl undecanol-4 and oxo process alcohols may be used. Hydroxy fatty alcohols, such as 12 hydroxy stearyl alcohol, ricinoleyl alcohol, the hydroxy alcohols derived by reduction of dimerized linoleic acid (such as "dimer acids" manufactured by Emery Industries, Inc., Cincinnati, Ohio) may also be used. The alcohols employed may also contain substituted halogen atoms, for example, dichlorostearyl alcohol, and 10,11-dichlor undecanol.

PREPARATION C

| | Parts |
|---|---|
| Lauryl alcohol | 63 |
| Diethylene glycol | 212 |
| Paraformaldehyde (91%) | 77 |
| Toluene | 35 |
| p.Toluene sulfonic acid | 0.2 |

The above materials are mixed together and heated under reflux, using a Dean and Stark moisture trap, until 42 parts of water of reaction are removed. The toluene is then evaporated in vacuo, leaving a product which is a clear mobile liquid when hot and which forms a pasty fluid when cool. Gas sparging, vacuum distillation or azeotropic distillation is useful in preparing this material which is readily dispersible in water. The product of this example is an excellent surfactant for use in the preparation of aqueous emulsions of hydrocarbons.

The use of fatty alcohols of higher chain lengths and of branched chains is illustrated in the following preparations:

PREPARATION D

| | Parts |
|---|---|
| Tridecyl alcohol (oxo process) | 100 |
| Diethylene glycol | 530 |
| Paraformaldehyde (91%) | 165 |
| Toluene | 35 |
| p.Toluene sulfonic acid | 0.1 |

Other polyalkylene glycols besides diethylene glycol and mixtures thereof may be used to prepare these products as shown in Preparations E and F.

PREPARATION E

| | Parts |
|---|---|
| Tridecyl alcohol | 20 |
| Polyethylene glycol 200 | 100 |
| Paraformaldehyde (91%) | 18.2 |
| Toluene | 30 |
| p.Toluene sulfonic acid | 0.256 |

The above mixture was heated under reflux with a Dean and Stark trap until 12 parts of water were removed. Toluene was then evaporated in vacuo to leave a pale straw colored liquid which dispersed readily in water.

PREPARATION F

| | Parts |
|---|---|
| 2-butyl octanol-1 | 63 |
| Diethylene glycol | 212 |
| Dipropylene glycol | 43 |
| Paraformaldehyde (91%) | 88 |
| Toluene | 35 |

The above components were reacted as in Preparation A. The reaction was complete when 48 parts of water of reaction were obtained. The viscous liquid remaining behind was readily dispersible in water.

PREPARATION G

| | | Parts |
|---|---|---|
| Tridecyl alcohol (oxo process) | parts | 100 |
| Dipropylene glycol | do | 151 |
| Diethylene glycol | do | 362 |
| Paraformaldehyde (91%) | do | 164.5 |
| p.Toluene sulfonic acid | do | 0.8 |
| Toluene | ml | 50 |

The above materials are processed as in Preparation A and a straw colored, water-dispersible liquid is obtained.

Similarly, monofunctional alcohols derived from glycols such as 2-methoxy ethanol, 2-butoxy ethanol, 2-phenoxy ethanol, alkylphenoxy ethanols such as the p-t-amyl compound, methoxyethoxy ethanol, phenoxy-ethoxy ethanol, and the like are useful in preparing modified acetals. The alkoxy alkanol may be derived from aliphatic alcohols of from 1 to 35 carbon atoms or aromatic phenols of up to 20 carbon atoms. Illustrations of such compositions are shown in the following preparations.

PREPARATION H

| | Parts |
|---|---|
| Diethylene glycol | 101 |
| Beta methoxyethanol | 4 |
| Paraformaldehyde (91%) | 30 |
| Toluene | 20 |
| Sulfuric acid (99%) | 0.1 |

The above materials were reacted as in Preparation A to yield a viscous liquid possessing a faint ethereal odor and soluble in water. Its polymeric nature was shown by Rast molecular weight determination which had a value of 637.

PREPARATION I

| | Parts |
|---|---|
| Phenoxyethoxy-ethanol | 36.4 |
| Diethylene glycol | 148.4 |
| Paraformaldehyde (91%) | 50 |
| Toluene | 35 |
| p.Toluene sulfonic acid | 0.2 |

This reaction mixture was heated under reflux and 30 parts of water were removed. The toluene was evaporated to leave a light colored liquid. This could be dispersed in a mixture of water and 2-butoxy ethanol.

PREPARATION J

| | Parts |
|---|---|
| t-Amyl phenoxyethanol | 21 |
| Diethylene glycol | 74 |
| Paraformaldehyde (91%) | 25 |
| Toluene | 40 |
| p.Toluene sulfonic acid | 0.1 |

The polyacetals may be modified by interaction during preparation or thereafter with polyhydric alcohols such as glycerine, trimethylol ethane, trimethylol propane, hexanetriol, butanetriol, pentaerythritol, erythritol, mannitol, sorbitol, inositol, dipentaerythritol and other polyols containing from 3 to 10 carbon atoms and from 3 to 6 hydroxyl groups as in Preparations K to N.

PREPARATION K

| | Parts |
|---|---|
| Diethylene glycol | 80 |
| Sorbitol-crystalline | 32 |
| Paraformaldehyde (91%) | 30 |
| Toluene | 20 |
| Sulfuric acid (99%) | .1 |

These reactants were treated as in Preparation A. The product was a crystalline mass at room temperature, soluble in water, and with virtually no odor.

PREPARATION L

| | Parts |
|---|---|
| Diethylene glycol | 80 |
| Trimethylolethane | 40 |
| Paraformaldehyde (91%) | 30 |
| Toluene | 30 |
| p.Toluene sulfonic acid | 0.1 |

All components were mixed and refluxed using a Dean and Stark trap. When 18 parts of water of reaction had been removed toluene was evaporated giving rise to a slightly yellow liquid which formed a clear solution in a mixture of water and 2-methoxy-ethanol.

PREPARATION M

| | Parts |
|---|---|
| Diethylene glycol | 95 |
| Dipentaerythritol | 25 |
| Paraformaldehyde (91%) | 33 |
| Toluene | 30 |
| p-Toluene sulfonic acid | 0.2 |

All compounds are mixed and heated under reflux using a water trap until 19 parts of water of reaction are obtained. A clear syrup results.

PREPARATION N

| | Parts |
|---|---|
| Pentaerythritol | 14 |
| Tetradecanol | 22 |
| Diethylene glycol | 85 |
| Paraformaldehyde (91%) | 33 |
| Toluene | 35 |
| p.Toluene sulfonic acid | 0.2 |

The above components were refluxed, using a Dean and Stark trap, until 18 parts of water of reaction were obtained. After toluene was evaporated in vacuo a water-dispersible liquid was obtained.

Mixtures of aldehydes and dialdehydes in the preparation of suitable polyacetals are illustrated in Preparation O.

PREPARATION O

| | Parts |
|---|---|
| Diethylene glycol | 106 |
| Paraformaldehyde (91%) | 52 |
| Glyoxal (30%) | 39 |
| Toluene | 20 |
| Sulfuric acid (99%) | 0.1 |

These components were reacted as in Preparation A. The product was a somewhat viscous yellow liquid with a faint ethereal odor. The product was soluble in water and in toluene.

Half esters of glycols may be employed in preparing modified polyacetals which may be used for insolubilizing starch, starch derivatives and polyvinyl acetate according to my present invention. Generally, compounds possessing the structure

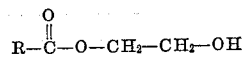

or

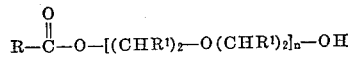

where R=an aliphatic radical of 1 to 34 carbon atoms and $R^1$=H or $CH_3$ and $n$=1 to 4, may be used to react with the remainder of the polyacetal-forming composition.

For example, formic, acetic, propionic, butyric, 2 ethylhexoic, stearic, and mellisic acid esters of glycols or polyglycols may be used. In a similar fashion, aromatic acid radicals may be used as R above such as benzoic, toluic, salicylic and naphthoic. Partial esters of polyhydric alcohols such as sorbitol stearates are also useful in this invention.

The organic acids enumerated above may be reacted per se with the polyacetals after the polyformal has been prepared or placed in the reaction mixture initially. The following example will serve to illustrate their use.

PREPARATION P

| | Parts |
|---|---|
| Polyformal of Preparation A | 118 |
| Pelargonic acid | 40 |
| Toluene | 40 |
| p.Toluene sulfonic acid | 0.1 | are heated under reflux until 4.5 parts of water are removed.

Acids useful in the preparation of modified polyacetals include formic, acetic, propionic, butyric, valeric, caproic, caprylic, capric, lauric, myristic, palmitic, stearic, mellisic, and the like, and include carboxylic acids containing from 1 to 35 carbon atoms. The acids are used in minor quantities up to about 50 mole percent of the total intermediates.

Unsaturated acids with carbon chains of 3 to 18 carbon atoms such as acrylic, crotonic, oleic, linoleic and linolenic may also be used.

PREPARATION Q

| | Parts |
|---|---|
| Crotonic acid | 21.5 |
| Diethylene glycol | 106 |
| Paraformaldehyde (91%) | 29 |
| Toluene | 40 |
| p.Toluene sulfonic acid | 0.1 | are heated under azeotropic distillation until 18 parts of water of reaction are removed. A light yellow water-soluble liquid is obtained.

It is obvious that esters may be made of the modified polyacetals described above. Thus, esters of polyacetals made from mixtures of reactants are included within the scope of this invention.

Half esters of dicarboxylic acids are also useful in the preparation of modified polyacetals used in this invention. Thus:

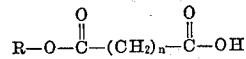

are useful where R represents an alkyl group of 1 to 35 carbons and $n$=1 to 10. Similarly, half esters of diglycolic acid, oxalic acid, ethylene-bisglycolic acid, thiodiglycolic acid, and phthalic acids may also be used.

Hydroxy acids may also be used to modify the polyacetals described above. Thus, glycolic acid, lactic acid, citric acid and hydroxy stearic acid may be used to modify the polyacetal condensation products by esterification or acetalization.

Amide-containing polyacetals may also be employed. They may be made by reacting the aldehyde and glycol in the presence of an amide of an organic acid. The following is an illustrative example of such amide modified acetal.

PREPARATION R

| | Parts |
|---|---|
| Diethylene glycol | 53 |
| Paraformaldehyde (91%) | 30 |
| Water | 50 | are mixed and refluxed to a clear solution at a pH of 8.5 (obtained by the use of sodium hydroxide). Then 71 parts of stearamide are added and the entire mass is heated to a liquid and then acidified with phosphoric acid. 0.2 part of p-toluene sulfonic acid and 40 parts of toluene are added and the whole mass is heated under reflux with a Dean and Stark trap until the water used originally and the water of reaction are both removed. A wax-like product is obtained which readily forms a paste with water.

Cyclic acids such as benzoic, toluic, furoic, naphthoic and others containing up to 20 carbon atoms may also be employed.

Condensation products containing both ester and acetal linkages may be prepared from dibasic acids and from polybasic acids as in the preparations shown below.

PREPARATION S

| | Parts |
|---|---|
| Diethylene glycol | 106 |
| Phthalic anhydride | 68 |
| Paraformaldehyde (91%) | 16.5 |
| p.Toluene sulfonic acid | 0.2 |
| Toluene | 30 |

After removing 19.5 parts of water by azeotropic distillation, toluene was evaporated leaving a somewhat viscous light straw-colored syrup capable of limited dilution with water.

Examples of dicarboxylic acids useful in these preparations are oxalic, succinic, maleic, fumaric, glutaric, adipic, sebacic, suberic, azelaic, phthalic, tetrachlorophthalic acid, methylene disalicylic acid and pyromellitic anhydride.

Another preparation is shown in T.

PREPARATION T

| | Parts |
|---|---|
| Methylene disalicylic acid | 28.8 |
| Diethylene glycol | 106 |
| Paraformaldehyde (91%) | 30 |
| p.Toluene sulfonic acid | 0.1 |

The components above are mixed and heated under reflux until all water of reaction is removed azeotropically. The balance is then evaporated leaving a light yellow syrup which was soluble in alkaline aqueous solution.

Hydroxy aldehydes such as glycolicaldehyde, glyceraldehyde and hydroxyadipaldehyde may also be used in preparing compositions useful for the purposes of this invention.

An illustration is shown below:

PREPARATION U

| | Parts |
|---|---|
| Hydroxypivaldehyde | 100 |
| Diethylene glycol | 106 |
| p.Toluene sulfonic acid | 0.2 |
| Toluene | 40 |

These materials were heated under reflux using a Dean and Stark trap until all water of reaction had been removed from the reaction mixture. The balance was then evaporated in vacuo giving rise to a colorless liquid which was compatible with water in a 1:1 ratio.

Precursors of dialdehydes, such as alkoxy-dihydro-pyranes and dialkoxy-tetrahydro-furanes may be used in preparing these polyacetals. Preparation V illustrates this method.

PREPARATION V

| | Parts |
|---|---|
| Diethylene glycol | 35 |
| 2-ethoxy-3,4-dihydro-2H-pyran | 42 |
| Methanol | 23 |
| p.Toluene sulfonic acid | 0.015 |

The reaction mixture is heated together. An exothermic reaction ensues to yield a light yellow water soluble liquid.

The following examples serve to illustrate the use of these products according to the process of this invention.

The carbohydrate polymers may be insolubilized as films on glass. The following example serves to illustrate this point.

Example 1

| | Parts |
|---|---|
| Polymer | 5 |
| Ammonium chloride | 2 |
| Product of Preparation A | 3.5 |
| Water | 89.5 | were dissolved in aqueous solutions as follows:

Five parts, respectively, of hydroxyethyl cellulose (known as Avcoset WS and sold by the American Viscose Company) and polyvinyl alcohol (known as Elvanol 52-22 and sold by E. I. du Pont de Nemours & Co. (Inc.), were dissolved in 89.5 parts of water containing 3.5 parts of Preparation A and 2 parts of ammonium chloride.

Ten parts of each solution were poured into separate Petri dishes and the water evaporated to dryness. The Petri dishes were then heated at 300° F. for 5 minutes. After cooling, water was placed in the dishes and it was found that the films were not soluble in water. Films prepared as above but without the product of Preparation A proved to be soluble in water after identical treatment.

In the following example, solutions were made up containing the designated amount of the specific starch, modified starch, or vinyl resin stated in each example, together with the product of Example A and catalyst.

The solution concentrations are given in percent by weight. These solutions were applied to the fabric by padding twice through a textile padder and nipping through the rolls twice to obtain 100% wet pickup. The fabrics were then dried at 180° F. and subjected to various curing temperatures depending on the nature of the fabric. Retention was determined by measuring stiffness in grams on a Thwing-Albert Handle-O-Meter. After washing and subsequent ironing on a flat bed press, the stiffness of the same sample was again determined with the same instrument. The percentage retention of the finish was from the following formula:

$$\frac{\text{Stiffness after washing} - \text{untreated stiffness}}{\text{Afterwashed stiffness} - \text{untreated stiffness}} \times 100$$

A stiffness index was also set up to determine relative stiffness. Thus:

$$\frac{\text{Stiffness after washing}}{\text{Blank stiffness}} = \text{stiffness index}$$

Example 2

Rayon challis was padded through padding solutions containing 3.5% of Preparation A, 0.4% zinc chloride and 1.6% of diglycolic acid as catalysts, and 4% of the starch or modified starches listed in the following table. The results are shown below and are compared with those obtained with rayon challis treated with 4% solutions of the same starch or modified starches containing no additional chemical. Treated fabric samples were dried at 180° F. and subsequently heated at 315° F. for 5 minutes.

| Product | Afterwash [5] Stiffness Index | Wash Retention,[6] percent | |
|---|---|---|---|
| | | 1 Wash | 5 Washes |
| Pearl corn starch and Preparation A | 3.0 | 55.7 | 42.5 |
| Pearl corn starch—No other chemical | 3.2 | 10.0 | 0.0 |
| Oxidized corn starch [1] and Prep. A | 8.6 | 55.2 | 55.0 |
| Oxidized corn starch [1]—No other chemical | 8.4 | 0 | 0 |
| Hydroxyethyl starch [2] and Prep. A | 10.9 | 83.5 | 81.0 |
| Hydroxyethyl starch [2]—No other chemical | 11.1 | 15.0 | 0.0 |
| Amioca starch acid hydroloyzed and Preparation A | 7.5 | | 60.3 |
| Amioca starch acid hydrolyzed [3]—no other chemical | | | 0.0 |
| White corn dextrine [4] and Preparation A | 2.0 | | 81.7 |
| White corn dextrine [4]—No other chemical | | | 0.0 |

[1] Oxidized Corn Starch prepared by alkaline hypochlorite treatment of corn starch known as "X Gum," Product of Clinton Foods, Inc., Clinton, Iowa.
[2] Hydroxyethyl Starch known commercially as "Penford Gum 380," made by Penick & Ford, New York, N.Y.
[3] Amioca Starch—acid hydrolyzed, known commercially as "Flokote" made by National Starch Products, Inc., New York, N.Y.
[4] White Corn Dextrine—known commercially as "Globe 7011 Gum," sold by Corn Products Sales, Phila., Pa.
[5] 195° F.—15 minutes.
[6] AATCC 1952 Standard Test Method 14-52.

It may be seen from this table that a considerable amount of starch or starch derivative is retained on rayon by the process of this invention, as measured by stiffness retention.

A similar relationship holds on impregnation of cotton fabrics.

Example 3

Preparation A was applied to cotton sheeting in 7% concentration in a bath containing 2% by weight of magnesium chloride hexahydrate and 2% of the stated starch derivative. The fabric, treated as in Example 1, was dried at 180° F. and cured at 300° F. for 5 minutes.

The results are shown below:

| Starch Derivative | Percent Retention, 5 Washes | Stiffness Index, 5 Washes |
|---|---|---|
| Hydroxyethyl starch & Preparation A | 66.3 | 1.5 |
| Hydroxyethyl starch—No other chemical | 0.0 | 1.0 |
| Hydrolyzed amioca starch | 55.0 | 1.4 |
| Hydrolyzed amioca starch—No other chemical | 0.0 | 1.0 |

The polyacetals described herein are of great value in insolubilizing polyvinyl acetate polymers and copolymers.

The following example is illustrative of their value in this manner when applied to rayon challis.

A similar relationship holds on impregnation of cotton fabrics.

*Example 4*

Rayon challis was treated as in Example 1. 3.5% of Preparation A was applied along with 0.4% of zinc chloride and 1.6% of diglycolic acid and 2.0% of polymer solids. The stiffness in grams is shown below after one and five washes at the boil.

| Polymer | Stiffness After-washed | Stiffness 1 Wash | Stiffness 5 Washes |
|---|---|---|---|
| Polyvinyl acetate (No polyacetal—no catalyst) | 10.6 | 5.0 | 3.9 |
| Polyvinyl acetate and Prep. A | 16.2 | 16.8 | 13.2 |
| Acrylic vinyl acetate copolymer (no polyacetal—no catalyst) | 5.5 | 4.4 | 3.6 |
| Acrylic vinyl acetate copolymer and Prep. A | 8.9 | 7.1 | 6.6 |
| No treatment | 2.2 | 2.2 | 2.2 |

Thus, a considerable portion of stiffness is retained in the case of the polyvinyl acetate and the vinyl acetate-acrylate copolymer even after severe laundering.

Under appropriate conditions of catalysis polyvinyl acetate may also be insolubilized on cotton fabrics.

*Example 5*

In a manner similar to Example 2, 3.5% of Preparation A, 1% of magnesium chloride hexahydrate and 1% of 90% formic acid as catalysts, and 2.0% of resin emulsions as polymer solids were applied to cotton sheeting.

The results are shown below:

| Resin | 5 Washes, Percent Retention | Stiffness Reading (Based on noncatalyzed retention) |
|---|---|---|
| Low viscosity polyvinyl acetate and Preparation A | 41 | 15.9 |
| Low viscosity polyvinyl acetate (No catalyst—No reactant) | 0 | 10.6 |
| High viscosity polyvinyl acetate and Preparation A | 92 | 25.2 |
| Polyvinyl acetate and Preparation A (No lyst—No reactant) | 18.5 | 13.9 |
| No treatment | | 10.0 |

*Example 6*

Cotton sheeting was treated as in Example 2 with a bath containing 10% of Preparation V, 2% of magnesium chloride hexahydrate and 2 parts of polyvinyl acetate resin. Cures were effected as in Example 2.

| Resin | Percent Retention, 5 Washes | Stiffness Index |
|---|---|---|
| Low viscosity polyvinyl acetate | 100 | 2.6 |
| Resin only | 15 | 1.1 |
| High viscosity polyvinyl acetate | 100 | 3.8 |
| Polyvinyl acetate | 32 | 1.4 |

Results similar to those obtained with polyvinyl acetate are given by polyvinyl formate and polyvinyl propionate.

Application on cotton of starches and modified starches of Preparation V resulted in excellent retention of the applied products.

On rayon a combination of Preparation V and pentaerythritol diformal as well as Preparation V itself gave comparable retention of polyvinyl acetate finishes.

*Example 7*

The treatment in Example 1 on rayon challis was repeated except that the bath contained 5% of Preparation V, 5% of pentaerythritol diformal, 4% of the starch or modified starch and 0.4% zinc chloride and 1.6% diglycolic acid. The results are shown below:

| Starch Product | 5 Washes—Percent Retention | 5 Washes Stiffness Index |
|---|---|---|
| Pearl corn starch | 95.6 | 3.3 |
| Oxidized corn starch | 104 | 10.2 |
| Hydroxyethyl starch | 115.2 | 9.0 |
| Hydrolyzed amioca starch | 91.8 | 9.1 |
| White corn dextrine | 104 | 5.6 |

The products below were treated in a bath containing only the starch product in the same 4% concentration.

| | | |
|---|---|---|
| Pearl corn | 0.0 | 1.0 |
| Oxidized corn starch | 0.0 | 1.0 |
| Hydroxyethyl starch | 5.0 | 1.0 |
| Hydrolyzed amioca starch | 0.0 | 1.0 |
| White corn dextrine | 0.0 | 1.0 |

*Example 8*

The process of this invention may be carried out using other fabrics finished with polymeric materials. Thus, it has been found effective on cellulose acetate fabrics, such as cellulose triacetate known as "Arnel." In a treatment similar to Example 2 "Arnel" fabric was impregnated with a solution containing 3% of a polyvinyl acetate resin emulsion, percentage being on a solids basis, and 3.5% of Preparation A. The stiffness after a 160° F. laundering was 19.7 when compared with an untreated piece which showed a stiffness of 2.9.

Other non-cellulosic fabrics may be stiffened or otherwise modified by the procedures outlined herein. These include nylon, polyacrylonitrile polymer and copolymer textiles, polyester fibers and textiles and polyvinyl and polyvinylidene chloride and cyanide fibers and textiles and copolymers thereof. The process may also be applied to resin or starch treated non-woven compositions and films of the above-mentioned polymers as well as regenerated cellulose films.

Similar results are obtained using terephthalic polyester fabrics such as "Dacron" or nylons, polyacrylonitrile polymer such as "Orlon," "Acrilan" and the like, and on woolen fabrics, mixtures thereof and mixtures with cellulose fibers. These textile materials may be woven, non-woven, flocked or otherwise rendered into a two-dimensional state.

Paper and paper products, jute, hemp and the like may also be treated by a similar process in order to obtain effects caused by rendering insoluble starch, starch derivatives, and polyvinyl acetate polymers and copolymers present in compositions applied thereto.

Paper may be treated with the carbohydrate or vinyl polymers contained in either coating compositions or in sizes and these polymers may then be insolubilized by treatment with a polymeric acetal under appropriate curing conditions. The following examples serve to illustrate this.

*Example 9*

A commercial filter paper was impregnated with the following composition representative of soluble cellulose products.

| | Parts |
|---|---|
| Hydroxyethyl cellulose (known commercially as Cellosize[1] WPHS) | 1 |
| Product of Example 1 | 3.5 |
| Zinc chloride | 2 |

[1] Registered trademark—Carbide & Carbon Chemical Company.

The paper was permitted to drain and then cured in a circulating hot air convection oven at 300–310° F. for 7 minutes. The paper was then cut into strips and the wet tensile strength determined.

| Sample Treatment | Wet Tensile, grams |
|---|---|
| As above | 748 |
| As above with hydroxyethyl cellulose omitted | 518 |
| Untreated paper | 41 |

Thus, there is an improvement in wet strength with the product.

Example 10

Filter paper was treated as in the previous example using hydroxyethyl starch (known commercially as 'Penford Gum 380") instead of the hydroxyethyl cellulose. A ten-fold increase in wet strength was obtained when compared with an untreated piece.

Example 11

In a similar manner, ½ part of polyvinyl alcohol (Elvanol 52–22) was used in place of the hydroxyethyl starch of Example 10 and stiffened paper was obtained which showed a wet strength of 35% compared with an untreated piece which showed a wet strength of only 3%.

Example 12

An emulsion containing:

| | Percent |
|---|---|
| Polyvinyl acetate | 10 |
| Clay pigment | 10 |
| Product of Example 1 | 5 |
| Zinc chloride | 0.6 |
| Diglycolic acid | 2.4 | was spread on sized paper board with a doctor blade and then cured at 300° F. for 7 minutes. A glossy, greaseproof coating was obtained which did not block at 200° F. and did not rub off when wet.

Example 13

My process of insolubilizing hydroxyl-bearing polymers as herein described is also useful in preparing water-proof adhesives.

Thus, to a water suspension of corn starch containing 40 parts of corn starch and 60 parts of water are added 5 parts of the product of Preparation A and 3 parts of paper makers alum. The components are mixed to form a paste. The paste is then spread between two pieces of spruce veneer and cured under a pressure of 125 lb./sq. in. for about 40 minutes at 250° F. The plies of the cured pieces will adhere together even when immersed in water.

It will be seen in carrying out my process that it is necessary to catalytically cure the treated materials in order to insolubilize them. As catalysts, I may use acids, amine salts, metallic complexes, metallic halides and other salts and the like. Curing temperatures of 200° F. are effective, however, higher temperatures are unlimited in that the time of exposure to said temperatures may vary inversely with the temperature. Thus, sufficiently high temperature is required to effect the reaction.

It will be apparent that, in applying my process to textile fabrics, paper and the like, other adjuvants may also be present in the bath, such as various resins, sizing agents, water repellants, softeners, and the like.

I claim:

1. A method of insolubilizing polymeric water-soluble and dispersible hydroxyl-bearing materials and derivatives thereof selected from the group consisting of starches, modified starches, dextrines, polyvinyl esters, ethers and alcohols, water-soluble cellulose derivatives, natural gums, and dextran, which comprises reacting said materials in the presence of water with a preformed polymeric acetal, said polymeric acetal having at least two alkylidene radicals derived from at least one aldehyde having up to 10 carbon atoms and at least two alkylene radicals containing 2 to 4 carbon atoms in a straight chain derived from a compound selected from the group consisting of monoalkylene glycols, polyalkylene glycols and alkylene oxides.

2. A method for insolubilizing polymeric water-soluble and dispersible hydroxyl-bearing materials and derivatives thereof as defined in claim 1, wherein the polymeric acetal is modified with a reactive group derived from a compound selected from the group consisting of alcohols containing up to 35 carbon atoms.

3. A method for insolubilizing polymeric water-soluble and dispersible hydroxyl-bearing materials and derivatives thereof as defined in claim 1, wherein the polymeric acetal condensation product is modified with a polyhydric alcohol containing from 3 to 10 carbon atoms and from 3 to 6 hydroxyl groups.

4. A method for insolubilizing polymeric water-soluble and dispersible hydroxyl-bearing materials and derivatives thereof as defined in claim 1, wherein the polymeric acetal condensation product is modified with a compound selected from the group consisting of organic acids containing up to 35 carbon atoms, partial esters of said organic acids and amides of said organic acids.

5. A method for insolubilizing polymeric water-soluble and dispersible hydroxyl-bearing materials and derivatives thereof selected from the group consisting of starches, modified starches, dextrines, polyvinyl esters, ethers and alcohols, water-soluble cellulose derivatives, natural gums, and dextran, which comprises reacting said materials in the presence of water with a preformed polymeric acetal, said polymeric acetal being a condensation product of a glycol selected from the group consisting of monoalkylene and polyalkylene glycols in which the alkylene glycol has 2 to 4 carbon atoms in a straight chain and mixtures of the aforesaid glycols, and a reactive aldehyde selected from the group consisting of aliphatic and carbocyclic aldehydes containing up to 10 carbon atoms in monomeric form and mixtures of the aforesaid aldehydes, said condensation product containing at least 2 aldehyde units and at least two polyhydric alcohol units per molecule of condensation product.

6. A method for insolubilizing polymeric water-soluble and dispersible hydroxyl-bearing materials and derivatives thereof selected from the group consisting of starches, modified starches, dextrines, polyvinyl esters, ethers and alcohols, water-soluble cellulose derivatives, natural gums, and dextran, which comprises reacting said materials in the presence of water with a preformed polymeric acetal, said polymeric acetal being a condensation product of at least one dialkylene glycol in which the alkylene radical has 2 to 4 carbon atoms in a straight chain and at least one aliphatic monoaldehyde containing 1 to 10 carbon atoms, said acetal containing per molecule at least two dioxyalkylene radicals derived from said dialkylene glycol and at least two alkylidene radicals derived from said aldehyde.

7. A method for insolubilizing polymeric water-soluble and dispersible hydroxyl-bearing materials and derivatives thereof selected from the group consisting of starches, modified starches, dextrines, polyvinyl esters, ethers and alcohols, water-soluble cellulose derivatives, natural gums, and dextran, which comprises reacting said materials in the presence of water with a preformed polymeric acetal, said polymeric acetal being a condensation product of diethylene glycol, dipropylene glycol and formaldehyde, said acetal containing per molecule at least two dioxyalkylene radicals derived from said glycols and at least two alkylidene radicals derived from the formaldehyde.

8. A method for insolubilizing polymeric water-soluble and dispersible hydroxyl-bearing materials and derivatives thereof selected from the group consisting of starches, modified starches, dextrines, polyvinyl esters, ethers and alcohols, water soluble cellulose derivatives, natural gums, and dextran, which comprises reacting said materials in the presence of water with a preformed polymeric acetal, said polymeric acetal being a condensation product of diethylene glycol and formaldehyde, said acetal containing per molecule at least two dioxyethylene radicals derived from the diethylene glycol and at least two alkylidene radicals derived from the formaldehyde.

9. The method of stiffening textile materials which comprises applying to said textile materials an aqueous composition containing a hydroxyl-bearing material selected from the group consisting of starches, modified starches, dextrines, polyvinyl esters, ethers and alcohols, water-soluble cellulose derivatives, natural gums, and dextran, an acidic catalyst and a preformed polymeric acetal, said polymeric acetal having at least two alkylidene radicals derived from at least one aldehyde having up to 10 carbon atoms and at least two alkylene radicals containing 2 to 4 carbon atoms in a straight chain derived from a compound selected from the group consisting of monoalkylene glycols, polyalkylene glycols and alkylene oxides, and drying the treated textile materials at elevated temperature until the textile materials are stiffened.

10. The method of stiffening textile materials as defined in claim 9, wherein the aqueous composition contains a starch and the polymeric condensation product of diethylene glycol and formaldehyde.

11. A textile material stiffened by the process as defined in claim 9.

12. The method of treating sheet materials having associated therewith a hydroxyl-bearing material selected from the group consisting of starches, modified starches, dextrines, polyvinyl esters, ethers and alcohols, water-soluble cellulose derivatives, natural gums, and dextran, which comprises treating said sheet material in the presence of water with a preformed polymeric acetal and a catalyst at an elevated temperature to insolubilize the hydroxyl-bearing materials.

13. The method of treating cellulosic materials having associated therewith a hydroxyl-bearing material selected from the group consisting of starches, modified starches, dextrines, polyvinyl esters, ethers and alcohols, water-soluble cellulose derivatives, natural gums, and dextran, which comprises treating said cellulosic material in the presence of water with a preformed polymeric acetal and a catalyst at an elevated temperature to insolubilize the said hydroxyl-bearing materials.

14. An aqueous composition containing starch, an acidic catalyst and a preformed polymeric acetal, said polymeric acetal having at least two alkylidene radicals derived from at least one aldehyde having up to 10 carbon atoms and at least two alkylene radicals containing 2 to 4 carbon atoms in a straight chain derived from a compound selected from the group consisting of monoalkylene glycols, polyalkylene glycols and alkylene oxides.

15. An aqueous composition containing a polyvinyl compound selected from the group consisting of polyvinyl esters, ethers and alcohols, an acidic catalyst and a preformed polymeric acetal, said polymeric acetal having at least two alkylidene radicals derived from at least one aldehyde having up to 10 carbon atoms and at least two alkylene radicals containing 2 to 4 carbon atoms in a straight chain derived from a compound selected from the group consisting of monoalkylene glycols, polyalkylene glycols and alkylene oxides.

References Cited in the file of this patent

UNITED STATES PATENTS

| | | |
|---|---|---|
| 2,196,752 | Dickey | Apr. 9, 1940 |
| 2,245,260 | Dickey | June 10, 1941 |
| 2,350,350 | Gresham | June 6, 1944 |
| 2,360,477 | Dahle | Oct. 17, 1944 |
| 2,661,312 | Richardson | Dec. 1, 1953 |
| 2,682,532 | Adelman | June 29, 1954 |
| 2,771,337 | Gagarine | Nov. 20, 1956 |
| 2,785,995 | Kress | Mar. 19, 1957 |
| 2,808,341 | Canter | Oct. 1, 1957 |
| 2,831,853 | Satterly | Apr. 22, 1958 |